(No Model.)
S. SHREFFLER, Jr.
Door Hanger.
No. 232,555. Patented Sept. 21, 1880.
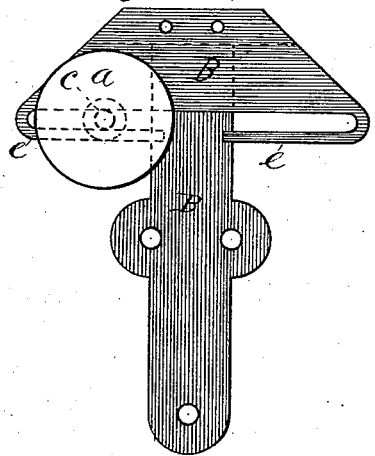
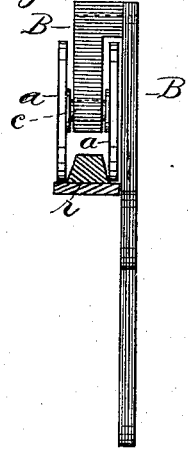
Witnesses
Thos. H. Hutchins
Wm. J. Hutchins
Inventor
Samuel Shreffler Jr

UNITED STATES PATENT OFFICE.

SAMUEL SHREFFLER, JR., OF MORRIS, ILLINOIS.

DOOR-HANGER.

SPECIFICATION forming part of Letters Patent No. 232,555, dated September 21, 1880.

Application filed March 19, 1880. (No model.)

*To all whom it may concern:*

Be it known that I, SAMUEL SHREFFLER, Jr., of Morris, in Grundy county, State of Illinois, have invented certain Improvements in Barn-Door Hangers, (Case C,) the construction and operation of which I will proceed to explain, reference being had to the annexed drawings, making a part of this specification, in which—

Figure 1 is a rear elevation, and Fig. 2 an end elevation.

This invention relates to that class of door-hangers from which the door hangs and rolls by means of grooved wheels at the top, guided by a rail or track, to open and close the door; and the improvement claimed to have been made consists in the form of the hanger, to prevent the traveling wheels from becoming disengaged from it.

In the drawings, B represents the hanger, to which the door is screwed or bolted in the ordinary manner, the upper end of which bears upon the axle $c$ of the double tread-wheel $a$, as shown in Fig. 2, and upon which axle it rolls from side to side to open or close the door. When the door comes to a sudden stop, when either opened or closed, it will bound upward so as to throw the hanger off the wheels $a$, unless prevented. In order to prevent this the hanger B is so constructed that the axle $c$ rolls in the long slot, caused by returning a portion of the hanger under the axle-forming hooks $e$ shown in Fig. 1, which hooks $e$ inclose the axle $c$ so it cannot get out of place should the door bound upward when it is rolled open or shut in a violent manner.

The hooks $e$ may be long enough to come in contact with each other or not, as may be deemed advisable; but they should be long enough to inclose the axle when the door is entirely open or entirely closed, as the door is not liable to strike an obstruction except in one or the other of said positions. It is in this hook particularly that I claim my invention lies.

Having thus described my invention, what I claim as new, and desire to secure by Letters Patent, is as follows, to wit:

The hanger B, having the hooks $e$ to inclose the axle $c$ of the wheel $a$, in the manner and for the purpose set forth.

SAMUEL SHREFFLER, JR.

Witnesses:
 THOS. H. HUTCHINS,
 WM. J. HUTCHINS.